(12) United States Patent
Yao et al.

(10) Patent No.: US 7,643,112 B2
(45) Date of Patent: Jan. 5, 2010

(54) COLOR FILTER SUBSTRATE AND MANUFACTURING METHOD THEREOF

(75) Inventors: Jikai Yao, Beijing (CN); Qin Li, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 12/126,354

(22) Filed: May 23, 2008

(65) Prior Publication Data

US 2009/0086134 A1     Apr. 2, 2009

(30) Foreign Application Priority Data

Sep. 28, 2007     (CN) .................. 2007 1 0175310

(51) Int. Cl.
*G02F 1/1333*     (2006.01)
(52) U.S. Cl. ........................ 349/110; 349/106
(58) Field of Classification Search ............... 349/110, 349/106
See application file for complete search history.

(56) References Cited

U.S. PATENT DOCUMENTS

2006/0238694 A1     10/2006  Chen et al.
2008/0123030 A1*    5/2008   Song ..................... 349/110

FOREIGN PATENT DOCUMENTS

CN           1963606 A  *  5/2007

* cited by examiner

*Primary Examiner*—Frank G Font
*Assistant Examiner*—Eric Wong
(74) *Attorney, Agent, or Firm*—Ladas & Parry LLP

(57) ABSTRACT

The invention provides a color filter substrate and a method thereof. A color filter substrate comprises a substrate, and a post spacer, a black matrix and a color resin that are disposed on the glass substrate. A method for manufacturing a color filter substrate comprises forming post spacers on a substrate, forming a black matrix on the resultant substrate formed with the post spacers, and then forming color resin layers on the resultant substrate formed with the post spacers and the black matrix.

16 Claims, 4 Drawing Sheets

COLOR FILTER SUBSTRATE AND MANUFACTURING METHOD THEREOF

BACKGROUND

The present invention relates to a color filter substrate for a thin film transistor liquid crystal display (TFT LCD) and a manufacturing method thereof.

TFT LCDs, which have advantages of low power consumption, low manufacturing cost and substantially no radiation, have become mainstream in the current flat panel display market. A TFT LCD makes use of dielectric anisotropy and conductive anisotropy of liquid crystal molecules to display an image. Alignment of liquid crystal molecules can be modified when an external electric field is applied, causing liquid crystal material to generate various photoelectric effects.

A TFT LCD panel is formed by assembling a color filter substrate and a TFT array substrate facing each other. The color filter substrate and the TFT array substrate are separated with spacers to form a space for injecting liquid crystal material and are sealed with sealant to complete assembling of the display panel. The distance between the color filter substrate and the array substrate or a cell gap is maintained at a predetermined value. Typically, post spacers (PS) are prepared on the color filter substrate to maintain the cell gap between the substrates.

FIG. 1a is a cross-sectional view illustrating a conventional color filter substrate, comprising a glass substrate 101, a black matrix 102, color resin 103, and common electrode 104 disposed on the substrate 101 sequentially, with a post spacer 105 disposed on the common electrode 104.

FIG. 1b is a cross-sectional view for a pixel unit on the conventional color filter substrate. The black matrix 102 is provided for defining a pixel unit. Three neighboring red (R), green (G), and blue (B) pixel units comprise R, G, and B color resins 103 respectively. The common electrode 104 is formed on the black matrix and the color resins.

A conventional process for manufacturing a color filter substrate is described as follows. First, a black matrix 102 is formed on a glass substrate 101, followed by forming color resins 103 within the black matrix 102 on the glass substrate 101. Then a common electrode 104 is formed on the black matrix 102 and color resins 103. Lastly, a post spacer 105 is formed on the common electrode 104.

Since the post spacer 105 is positioned on the color filter substrate, the height of the post spacer is limited by the narrow cell gap. Even when a post spacer is formed of an elastic material, it is usually difficult to obtain sufficient elastic restoring force. In this case, if an external press goes beyond the predetermined elastic deformation range of the post spacer, a non-recoverable deformation is generated, leading to a cell gap variation. This variation may negatively influence the display and thereby affect the display quality of the liquid crystal display panel. Meantime, since the post spacer is positioned on the color filter substrate, the stability is poor. When subject to a horizontal impact, the post spacer may shift from its initial location, leading to light leakage.

SUMMARY

According to a first aspect of the invention, there is provided a color filter substrate, comprising a substrate; a post spacer having an end fixed on the substrate and another free end; a black matrix formed on the substrate, surrounding the end of the post spacer on the substrate, and exposing the free end of the post spacer; and a color resin formed on the glass substrate and exposing the free end of the post spacer.

According to a second aspect of the invention, there is provided a method for manufacturing a color filter substrate, comprising: step 1, forming post spacers on a substrate, with one end of the post spacer being fixed on to the substrate and the other end being a free end; step 2, forming a black matrix on the substrate after step 1, the black matrix surrounding the one end of the post spacer and exposing the free end of the post spacer; and step 3, forming a color resin layer on the substrate after step 2, respectively, and exposing the free end of the post spacer.

According to a third aspect of the invention, there is provided a liquid crystal display (LCD) panel, comprising an array substrate and a color filter substrate disposed facing each other. The array substrate comprises a pixel unit defined by intersection of a gate scan line and a data scan line, and the pixel unit comprises a thin film transistor (TFT) as a switch device. The color filter substrate comprises a substrate; a post spacer having an end fixed on the substrate and another free end; a black matrix formed on the substrate, surrounding the end of the post spacer on the substrate, and exposing the free end of the post spacer; and a color resin formed on the glass substrate and exposing the free end of the post spacer. The free end of the post spacer is located against the array substrate after the array substrate and the color filter substrate are assembled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWING

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

Exemplary embodiments of the present invention will be described hereafter with reference to the accompanying drawings. It will be understood that when a layer or element is referred to as being "on" or "connected to" another layer or substrate, it can be directly on or connected to the other layer or substrate, or intervening layers may also be present. The same reference number refers to the same part in the following drawings.

Figure 1A:
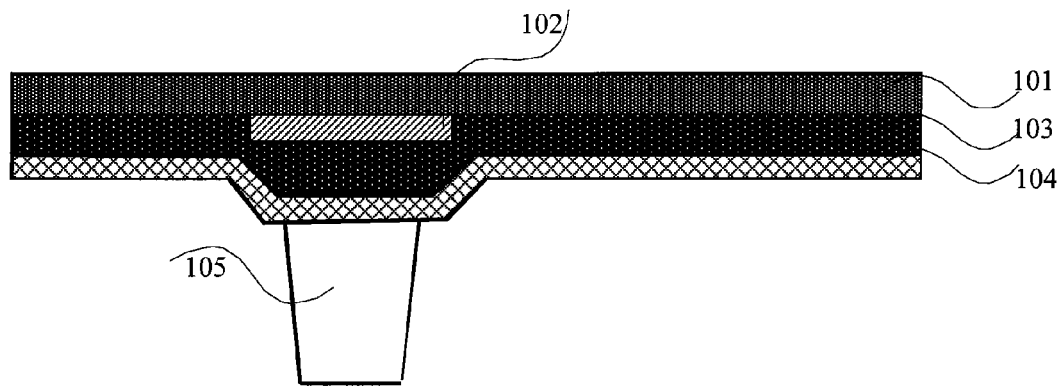
FIG. 1a is a cross-sectional view of a conventional color filter substrate.
Figure 1B:
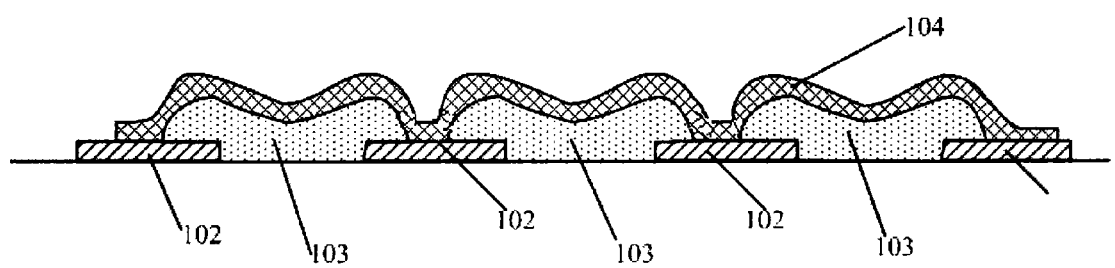
FIG. 1b is a cross-sectional view of a pixel unit on a conventional color filter substrate.
Figure 2:
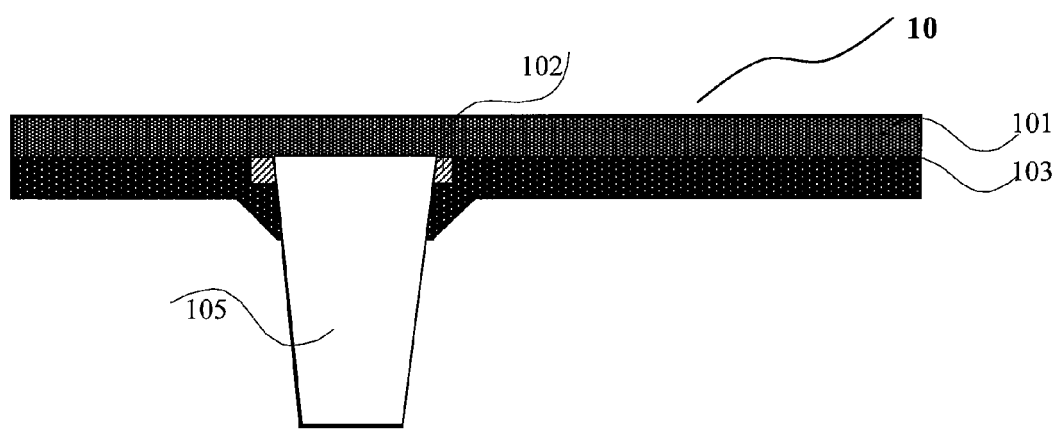
FIG. 2 is a cross-sectional view of a color filter substrate according to an embodiment of the present invention.

FIG. 2 is a cross-sectional view for a color filter substrate 10 according to an embodiment of the present invention, comprising a substrate such as a glass or plastic substrate 101, a post spacer 105, a black matrix 102 and a color resin 103. The post spacer 105 has one end fixed on the substrate 101 and another free end. The black matrix 102 is formed on the glass substrate 101 surrounding the post spacer 105, and the black matrix 102 closely encloses the root end of the post spacer 105 and exposes the free end of the post spacer 105. The color resin 103 is formed on the glass substrate 101 and on the matrix 102, covering the substrate 101 and leaving the free end of the post spacer 105 exposed. According to the embodiment, a common electrode 104 is further formed on the color resin 103, leaving the free end of the post spacer 105 exposed (refer to FIG. 3). In practical, for example, in a fringe field switching (FFS) or in-plane switching (IPS) mode LCD, the common electrode is formed on the array substrate; accordingly no common electrode is formed on the color filter substrate.

According to the embodiment, the post spacer is directly disposed on or fixed on the substrate, so that the effective length of the post spacer can be increased, thereby the effective elastic force of the post spacer can be increased and the cell gap can be maintained constant. In addition, the end of the post spacer, which is fixed on the color filter substrate, is enclosed by the black matrix and the color resin, and thereby the stability of the post spacer is improved to avoid light leakage. Accordingly, the display quality of the LCD panel can be improved.

Figure 3:
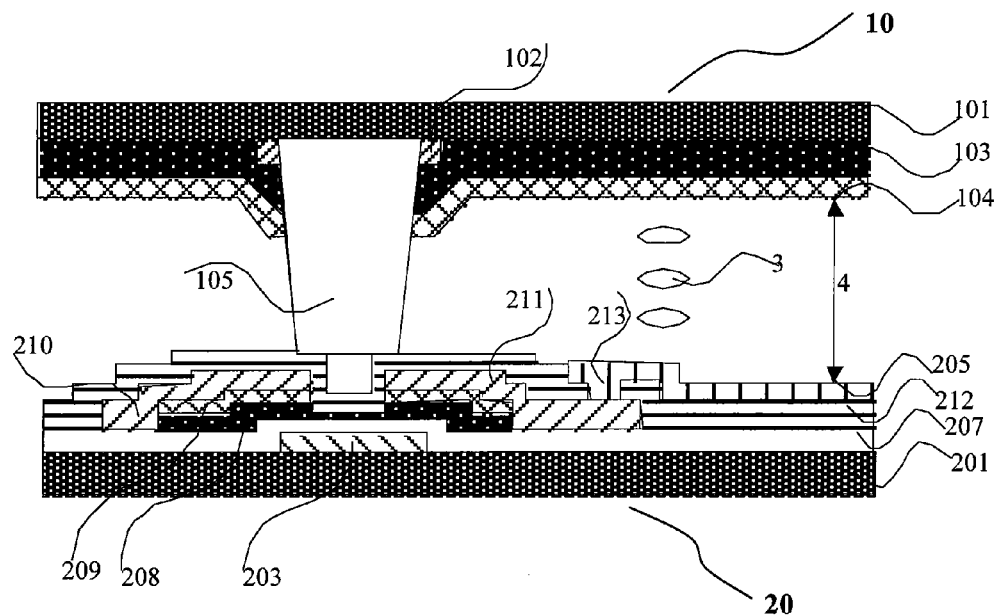
FIG. 3 is a cross-sectional view after a color filter substrate and an array substrate are assembled according to an embodiment of the present invention.

FIG. 3 is a cross-sectional view according to an embodiment of the present invention of the display panel, which is formed after a color filter substrate 10 and an array substrate 20 are assembled. According to the embodiment, the array substrate 20 comprises a glass substrate 201 and a gate scan line 203, a gate insulating layer 207, an amorphous silicon layer 208, a doped insulating layer 209, source and drain electrodes 210 and 211 disposed on the two sides of the layer 209, a passivation layer 212 disposed on the source and drain electrodes 210 and 211, and a pixel electrode 205 connected to the drain electrode 211 of the thin film transistor (TFT) through a via hole 213 formed in the passivation layer 212, which layers are sequentially stacked on the glass substrate 201. The color filter substrate 10 comprises a glass substrate 101 and a post spacer 105, a black matrix 102, a color resin 103 and a common electrode 104, which are provided on the substrate 101. Liquid crystal 3 is filled between the color filter substrate 10 and the array substrate 20. The distance between the color filter substrate 10 and the array substrate 20 is the cell gap 4. According to the embodiment, the post spacer is located on the top of the TFT.

Figure 4:
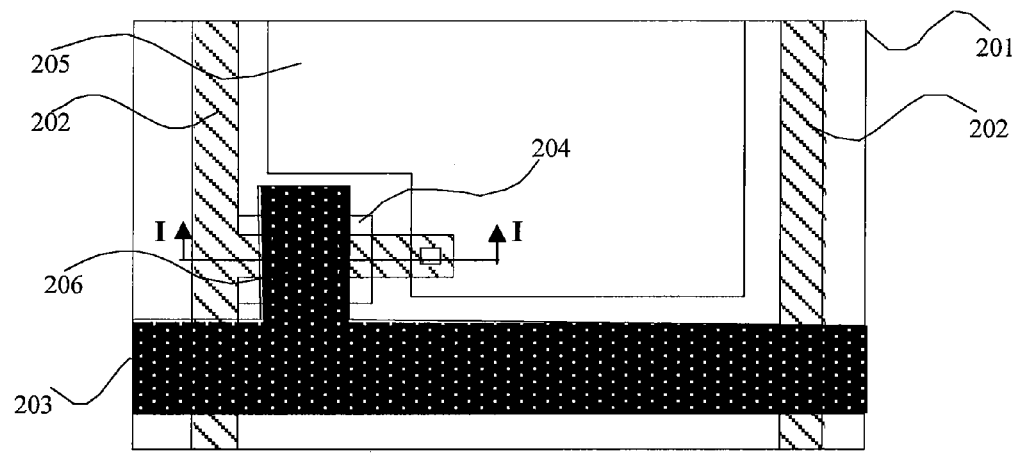
FIG. 4 is a partial top view of the array substrate in FIG. 3.

FIG. 4 is a partial top view of the array substrate 20 in FIG. 3. FIG. 3 is a cross-sectional view taken along the line I-I in FIG. 4. The array substrate 20 comprises the glass substrate 201 and the data scan line 202 and the gate scan line 203 that are formed on the substrate 201. The adjacent gate scan line 203 and data scan line 202 intersect each other to define a pixel unit, which comprises the TFT 204 as a switch device and the pixel electrode 205. Reference number 206 denotes the location of the post spacer 105 on the TFT 204 of the TFT array substrate 20 after assembling the color filter substrate 10 and the array substrate 20.

According to the present embodiment, the post spacer 105 is fixed on the glass substrate 101 of the color filter substrate 10, so that the cell gap can be maintained constant after color filter substrate 10 and the array substrate 20 are assembled. In addition, the stability of the post spacer can be improved, and the display quality of the LCD panel can be also improved.

Figure 5:
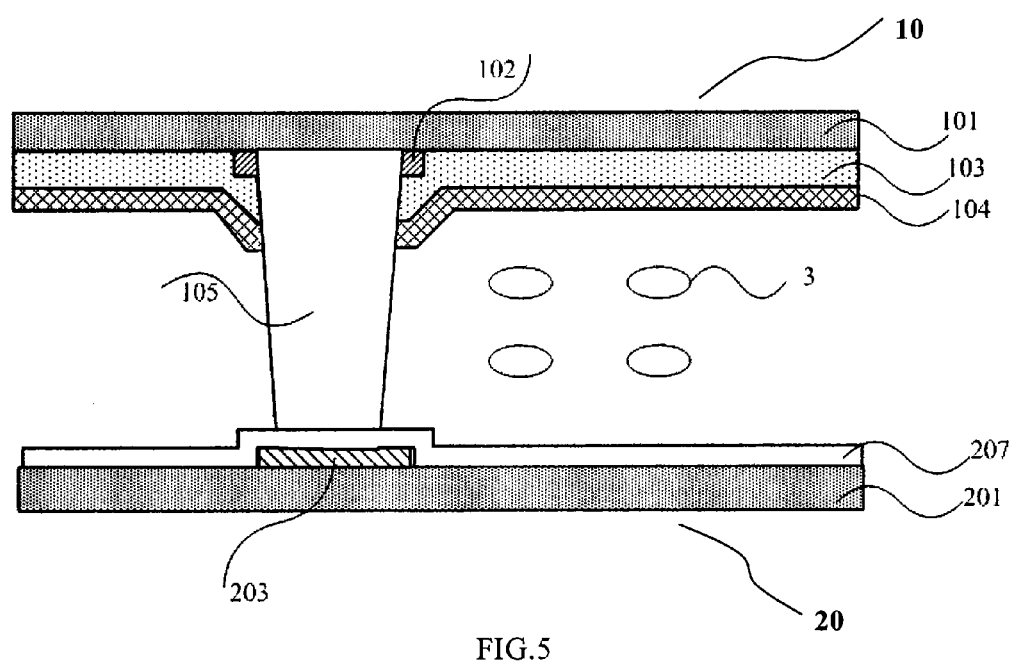
FIG. 5 is a cross-sectional view after a color filter substrate and an array substrate are assembled according to another embodiment of the present invention.

FIG. 5 is a cross-sectional view according to another embodiment of the present invention, after a color filter substrate and an array substrate are assembled. Different from the embodiment as shown in FIG. 3, a post spacer 105 is shifted from the top of the TFT to the top of a gate scan line 203 on an array substrate.

Figure 6:
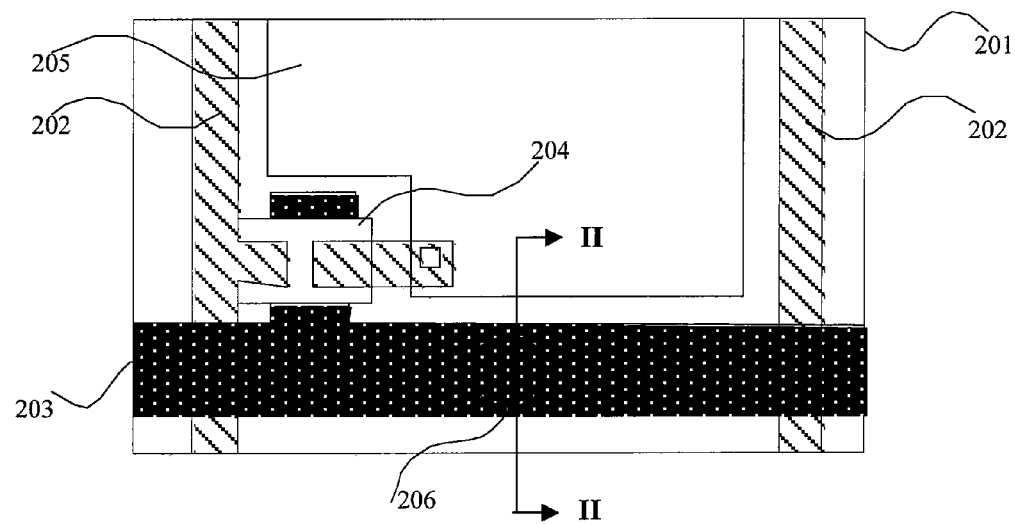
FIG. 6 is a partial top view of the array substrate in FIG. 5.

FIG. 6 is a partial top view of the array substrate as shown in FIG. 5. FIG. 5 is a cross-sectional view taken along the line II-II in FIG. 6. As shown in FIG. 6, reference number 206 indicates that the position the post spacer 105 on the array substrate is on the gate scan line after the color filter substrate 10 and the array substrate 20 are assembled.

According to the present embodiment, the contact position between the post spacer 105 and the array substrate 102 is shifted from a higher level on the top of the TFT to a lower level above the gate scan line, which is relatively flat, thus a movement from a higher level to a lower level does not occur when the post spacer being subject to an external press. In this configuration, besides the length and the elasticity of the post spacer can be further increased and the cell gap can be further stabilized, the light leakage caused by the shift of a post spacer to a lower level when the panel is under pressure or impact, can also be avoided. Therefore, the present embodiment may further increase the elasticity and stability of the post spacer; the cell gap is maintained and display quality of the LCD can be improved.

It can be seen from FIGS. 3-6 that the lengthwise section of the post spacer is of a trapezoid shape. A first end on the glass substrate of the color filter substrate 10 and a second end on the array substrate 20 of the post spacer may have a round shape, a quadrangle shape or a polygon shape in the cross section perpendicular to the substrates, and thereby the post spacer can have a larger contact area with the periphery to maintain its stability.

Figure 7:
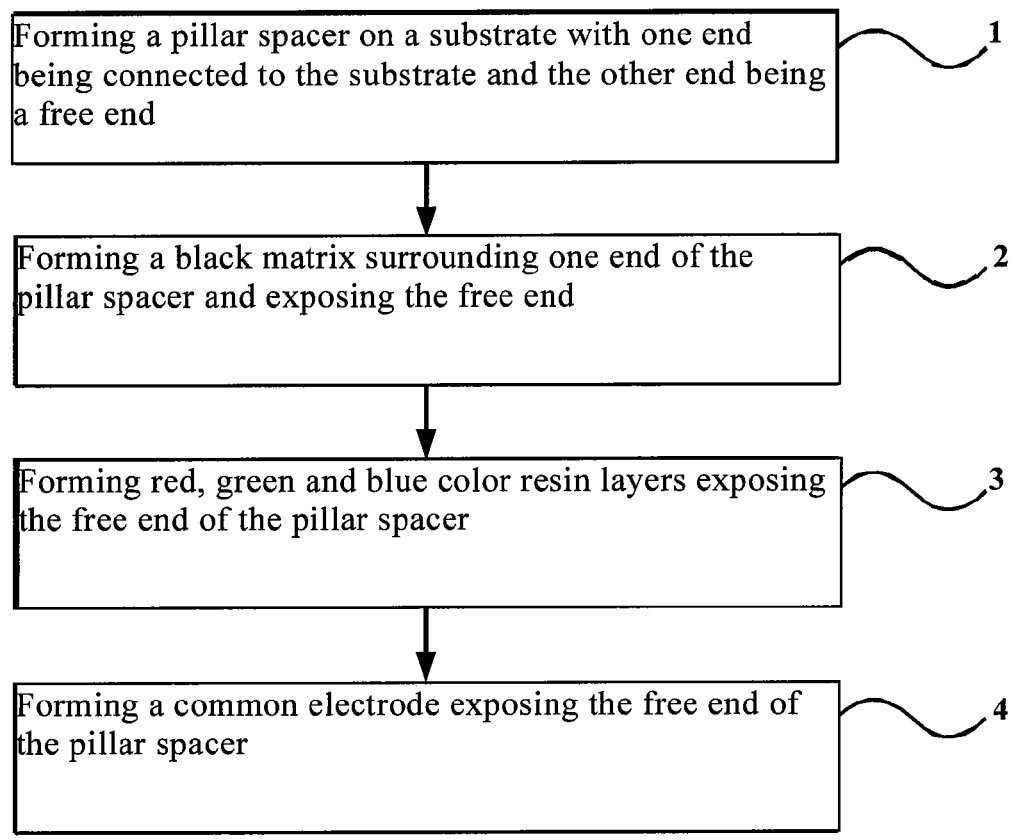
FIG. 7 is a flow chart for manufacturing a color filter substrate according to an embodiment of the present invention.

FIG. 7 is a flow chart for manufacturing a color filter substrate according to an embodiment of the present invention. The exemplary method may comprise the following steps.

Step 1, a post spacer is formed on a substrate such as a glass or plastic substrate through, for example, lithography process and etching process. The top surface of the post spacer has a round shape of a diameter of about 10 μm to 20 μm. The length of the post spacer has a height of about 5 μm to 10 μm.

Step 2, on the resultant substrate after step 1, a chromium or chromium oxide black matrix layer is deposited for example by CVD and then patterned, or a resin black matrix layer is coated for example by dispensing and then patterned. Thus, a black matrix layer having a thickness of about 1 μm to 5 μm can be prepared around the post spacer on the glass substrate. The black matrix is formed on a predetermined area of the glass substrate by exposure process and chemical etching process (for chromium or chromium oxide composition) using a mask or by chemical development (for resin composition).

Step 3, a red color resin layer is formed on the resultant color filter substrate after step 2. A red color resin layer is coated on the color filter substrate to a thickness of about 1 μm to 5 μm for example by dispensing method. The material of the color resin typically may be acrylic photosensitive resin or other carboxylic type pigment resin. Then a red pixel is patterned on a predetermined area of the glass substrate by exposure process and chemical development process.

A green pixel and a blue pixel are also respectively formed on predetermined areas of the glass substrate by a method similar to that for forming the red pixel.

Step 4, a common electrode layer is deposited on the resultant substrate after step 3, so as to form a common electrode which may be a transparent electrode. The typically used transparent electrode may comprise indium tin oxide (ITO) or indium zinc oxide (IZO) electrode with a thickness of about 1000 Å to 5000 Å.

According to the above method, the black matrix 102, the color resin 103 and the common electrode 104 can closely enclose around the post spacer 105 and are continuously formed. The total thickness of the black matrix 102, the color resin 103 and the common electrode 104 is less than the length of the post spacer 105. One end of the post spacer 105 is fixed on the glass substrate of the color filter substrate, and the other is a free end. The length of the post spacer 105 is selected such that the post spacer 105 can reach the top of the array substrate (as shown in FIG. 3) or reach the gate scan line on the array substrate (as shown in FIG. 5).

Also, in practical, for example in an FFS or IPS mode LCD, the common electrode is formed on the array substrate, and accordingly no common electrode is formed on the color filter substrate.

The embodiment of the invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. A color filter substrate, comprising:
  a substrate;
  a post spacer having an end fixed on the substrate and another free end and having lateral sides;
  a black matrix formed on the substrate, surrounding lateral sides of the post spacer near the end of the post spacer on the substrate and exposing the free end of the post spacer; and
  a color resin formed on the substrate exposing the free end of the post spacer.

2. The color filter substrate of claim 1, wherein the post spacer has a lengthwise section of a trapezoid shape.

3. The color filter substrate of claim 1, wherein the post spacer has a cross-section of a round shape, a quadrangle shape or a polygon shape.

4. The color filter substrate of claim 1, wherein the post spacer has a cross-section of a diameter of about 10 µm to 20 µm.

5. The color filter substrate of claim 1, wherein the post spacer has a length of about 5 µm to 10 µm.

6. The color filter substrate of claim 1, further comprising a common electrode formed on the color resin and exposing the free end of the post spacer.

7. A method for manufacturing a color filter substrate, comprising:
  forming a post spacer on a substrate, with one end of the post spacer being fixed on to the substrate and the other end being a free end;
  forming a black matrix on the substrate, the black matrix surrounding the lateral sides of the post spacer near the one end of the post spacer and exposing the free end of the post spacer; and
  forming a color resin layer on the substrate and exposing the free end of the post spacer.

8. The method of claim 7, wherein the post spacer has a cross-section of a diameter of about 10 µm to 20 µm at position where the post spacer is on the substrate.

9. The method of claim 7, wherein the post spacer has a length of about 5 µm to 10 µm.

10. The method of claim 7, wherein the black matrix has a thickness of about 1 µm to 5 µm.

11. The method of claim 7, wherein the color resin layer has a thickness of about 1 µm to 5 µm.

12. The method of claim 1, further comprising:
  forming a common electrode layer on the color resin layer and exposing the free end of the post spacer.

13. A liquid crystal display (LCD) panel, comprising:
  an array substrate and a color filter substrate disposed facing each other;
  wherein the array substrate comprises a pixel unit defined by intersection of a gate scan line and a data scan line, and the pixel unit comprises a thin film transistor (TFT) as a switch device;
  wherein the color filter substrate comprises:
    a substrate;
    a post spacer having an end fixed on the substrate and another free end and having lateral sides;
    a black matrix formed on the substrate, surrounding the lateral sides of the post spacer near the end of the post spacer on the substrate, and exposing the free end of the post spacer; and
    a color resin formed on the glass substrate and exposing the free end of the post spacer; and
  wherein the free end of the post spacer is located against the array substrate after the array substrate and the color filter substrate are assembled.

14. The LCD panel of claim 13, wherein the color filter substrate further comprises a common electrode formed on the color resin exposing the free end of the post spacer.

15. The LCD panel of claim 13, wherein the free end of the post spacer is located on the TFT on the array substrate after the array substrate and the color filter substrate are assembled.

16. The LCD panel of claim 13, wherein the free end of the post spacer is located on the gate scan line on the array substrate after the array substrate and the color filter substrate are assembled.

* * * * *